US007084397B2

(12) United States Patent
Hirano et al.

(10) Patent No.: US 7,084,397 B2
(45) Date of Patent: Aug. 1, 2006

(54) ION ATTACHMENT MASS SPECTROMETRY APPARATUS

(75) Inventors: Yoshiki Hirano, Fuchu (JP); Yoshiro Shiokawa, Hachioji (JP); Harumi Maruyama, Kunitachi (JP); Megumi Nakamura, Fuchu (JP)

(73) Assignee: Anelva Corporation, Fuchu (JP)

( * ) Notice: Subject to any disclaimer, the term of this patent is extended or adjusted under 35 U.S.C. 154(b) by 4 days.

(21) Appl. No.: 10/813,166

(22) Filed: Mar. 31, 2004

(65) Prior Publication Data

US 2004/0251408 A1 Dec. 16, 2004

(30) Foreign Application Priority Data

Mar. 31, 2003 (JP) ............................ 2003-095502

(51) Int. Cl.
*H01J 49/00* (2006.01)
*H01J 49/26* (2006.01)
*G01N 27/62* (2006.01)

(52) U.S. Cl. ...................... 250/288; 250/281; 250/283; 250/423 R; 313/359.1

(58) Field of Classification Search ..................... None
See application file for complete search history.

(56) References Cited

U.S. PATENT DOCUMENTS 6,590,205 B1 * 7/2003 Shiokawa et al. .......... 250/288

FOREIGN PATENT DOCUMENTS

| | | |
|---|---|---|
| JP | 06-011485 | 1/1994 |
| JP | 2001-174437 | 6/2001 |
| JP | 2001-351567 | 12/2001 |
| JP | 2001-351568 | 12/2001 |
| JP | 2002-124208 | 4/2002 |
| JP | 2002-170518 | 6/2002 |

OTHER PUBLICATIONS

V. Hodges et al., "Application of Alkali Ions in Chemical Ionization Mass Spectrometry", Analytical Chemistry, vol. 48, No. 6, May 1976, pp. 825-829 (discussed in the specification).

Daniel Bombick et al., "Potassium Ion Chemical Ionization and Other Uses of an Alkali Thermionic Emitter in Mass Spectrometry", Analytical Chemistry 1984, vol. 56, pp. 396-402 (discussed in the specification).

Toshihiro Fujii et al., "Chemical Ionization Mass Spectrometry with Lithium Ion Attachment to the Molecule", Analytical Chemistry 1989, vol. 61, pp. 1026-1029 (discussed in the specification).

Chemical Physics Letters, vol. 191 (1992), pp. 162-168 (discussed in the specification).

* cited by examiner

*Primary Examiner*—Nikita Wells
(74) *Attorney, Agent, or Firm*—Buchanan Ingersoll PC

(57) ABSTRACT

An ion attachment mass spectrometry apparatus causing positively charged metal ions to attach to molecules of a gas to be measured in an attachment region to generate attached ions and then performing mass spectrometry on the attached ions by a mass spectrometer, has a metal ion selective disassociation unit for selectively making the metal ions attached to the specific molecules in the attachment region disassociate. By making the metal ions attached to the specific molecules such as $H_2O$ disassociate, a state is formed where the metal ions are attached to only the sample gas to be measured and the reliability of measurement of the gas is improved.

10 Claims, 9 Drawing Sheets

A, B AND $H_2O$ ALL HEATED

A AND $H_2O$ HEATED

ONLY $H_2O$ HEATED

FIG. 10

TABLE 1

⟨$H_2O$ DATA⟩

| | | 1 | | | 2 | | | 3 | | |
|---|---|---|---|---|---|---|---|---|---|---|
| ABSORPTION($cm^{-1}$) | | 1600.4266 | | | 3804.6077 | | | 3927.6241 | | |
| INFRAED INTENSITY | | 87.3269 | | | 5.0588 | | | 53.8299 | | |
| RAMAN SCATTERING | | 3.9861 | | | 90.6885 | | | 41.1649 | | |
| ATOM | | X | Y | Z | X | Y | Z | X | Y | Z |
| 1 | O | 0.00 | 0.00 | 0.07 | 0.00 | 0.00 | 0.05 | 0.00 | 0.07 | 0.00 |
| 2 | H | 0.00 | -0.42 | -0.57 | 0.00 | 0.59 | -0.39 | 0.00 | -0.56 | 0.43 |
| 3 | H | 0.00 | 0.42 | -0.57 | 0.00 | -0.59 | -0.39 | 0.00 | -0.56 | -0.43 |

FIG. 11

TABLE 2

⟨$H_2OLi^+$ DATA⟩

| | | 1 | | | 2 | | | 3 | | |
|---|---|---|---|---|---|---|---|---|---|---|
| ABSORPTION($cm^{-1}$) | | 414.5520 | | | 542.8455 | | | 550.7633 | | |
| INFRAED INTENSITY | | 393.6313 | | | 156.0887 | | | 109.7634 | | |
| RAMAN SCATTERING | | 0.0293 | | | 0.0845 | | | 0.4622 | | |
| ATOM | | X | Y | Z | X | Y | Z | X | Y | Z |
| 1 | O | 0.00 | 0.00 | 0.12 | 0.09 | 0.00 | 0.00 | 0.00 | 0.32 | 0.00 |
| 2 | H | 0.00 | 0.00 | -0.70 | -0.36 | 0.60 | 0.00 | -0.01 | 0.33 | 0.00 |
| 3 | H | 0.00 | 0.00 | -0.70 | -0.36 | -0.60 | 0.00 | 0.01 | 0.33 | 0.00 |
| 4 | Li | 0.00 | 0.00 | -0.06 | -0.11 | 0.00 | 0.00 | 0.00 | -0.83 | 0.00 |
| | | 4 | | | 5 | | | 6 | | |
| ABSORPTION($cm^{-1}$) | | 1675.0619 | | | 3776.3382 | | | 3858.0805 | | |
| INFRAED INTENSITY | | 137.4893 | | | 99.0444 | | | 219.3061 | | |
| RAMAN SCATTERING | | 2.2496 | | | 70.0029 | | | 25.5333 | | |
| ATOM | | X | Y | Z | X | Y | Z | X | Y | Z |
| 1 | O | 0.00 | -0.07 | 0.00 | 0.00 | -0.05 | 0.00 | 0.07 | 0.00 | 0.00 |
| 2 | H | -0.43 | 0.56 | 0.00 | 0.58 | 0.40 | 0.00 | -0.57 | -0.43 | 0.00 |
| 3 | H | 0.43 | 0.56 | 0.00 | -0.59 | 0.40 | 0.00 | -0.56 | 0.42 | 0.00 |
| 4 | Li | 0.00 | 0.00 | 0.00 | 0.00 | 0.00 | 0.00 | 0.00 | 0.00 | 0.00 |

ION ATTACHMENT MASS SPECTROMETRY APPARATUS

BACKGROUND OF THE INVENTION

1. Field of the Invention

The present invention relates to an ion attachment mass spectrometry apparatus, more particularly relates to an ion attachment mass spectrometry apparatus suitable for measurement of components of sample gases to be measured.

2. Description of the Related Art

An ion attachment mass spectrometry (IAMS) apparatus is an apparatus for ionizing component molecules of a sample gas for mass spectrometry without disassociating the sample gas into component atoms, ions, atomic groups or other fragments. Such an apparatus is particularly effective for analysis of easily disassociating organic matter. The conventional ion attachment mass spectrometry apparatuses are reported by Hodge ("Analytical Chemistry", 1976, vol. 48, no. 6, p. 825), Bombick ("Analytical Chemistry", 1984, vol. 56, no. 3, p. 396), Fujii ("Analytical Chemistry", 1986, vol. 61, no. 9, p. 1026), and Fujii ("Chemical Physics Letters", 1992, vol. 191, no. 1.2, p. 162).

As patent publications disclosing the related arts, there are Japanese Patent Publication (A) No. 6-11485, Japanese Patent Publication (A) No. 2001-174437, Japanese Patent Publication (A) No. 2001-351567, Japanese Patent Publication (A) No. 2001-351568, Japanese Patent Publication (A) No. 2002-124208, and Japanese Patent Publication (A) No. 2002-170518.

The ion attachment mass spectrometry apparatus is provided with a metal ion emitter, an attachment region, and a mass spectrometer. These are arranged from the upstream side to downstream side in the ion attachment mass spectrometry apparatus in the order of the metal ion emitter, attachment region, and mass spectrometer. The metal ion emitter, attachment region, and mass spectrometer are all provided in a vacuum atmosphere of less than atmospheric pressure. The metal oxide of the metal ion emitter is heated to emit $Li^+$ or other positively charged metal ions. When the sample gas is introduced into the attachment region, the metal ions gently attach at locations with polarity of the molecules of the sample gas, that is, at locations with a bias in charge. The molecules to which the metal ions attached become ions having a positive charge (hereinafter referred to as "attached ions") overall. In the attached ions, the surplus energy, that is, the energy becoming a surplus at the time of attachment, is extremely small, so the molecules will not disassociate. Further, the surplus energy in the attached ions is quickly stripped by the collision with ambient gas such as $N_2$, so the attached ions become stable. The attached ions are transported from the attachment region to the mass spectrometer under the force of the electric field. The attached ions are then classified by mass and measured by the mass spectrometer.

When the above sample gases are obtained from the atmospheric air, auto emissions or the like, they contain large amounts of $H_2O$ (water component) in the form of vapor (or steam) derived from humidity in addition to the gas to be actually measured. In many cases, for example, several percent of $H_2O$ in terms of partial pressure (absolute humidity) is included in the case of room temperature such as atmospheric air, and 10% of $H_2O$ is included in the case of a high temperature such as auto emissions. Therefore, when measuring these sample gases by the above ion attachment mass spectrometry apparatus, there is a higher concentration of $H_2O$ in the attachment region than even the gas to be primarily measured.

Since $H_2O$ has a high polarity, that is, a strong bias in charge, it easily attaches to the metal ions. Therefore, if there is a large amount of $H_2O$ in the attachment region, the metal ions will attach to the $H_2O$ and the majority of the metal ions will be used up. As a result, the metal ions attached to the molecules of the sample gas to be inherently measured will be reduced and the measurement sensitivity of the sample gas will drop sharply.

Further, as to $H_2O$, polymers in which a single metal ion is attached to a plurality of molecules are also easily produced. For example, in case that a monomer such as $H_2O$ $Li^+$ would be normally produced as result, instead, a dimer of $(H_2O)_2Li^+$, trimer of $(H_2O)_3Li^+$, quatramer of $(H_2O)_4Li^+$ and the like will be produced. Further, $H_2ON_2Li^+$ or other polymers will be produced by being bonded with the $N_2$ that exists in large quantities as the ambient. These will overlap with the peaks of the sample gas and will end up causing interference. Therefore, the inherent reliability of measurement of the sample gas drops sharply. The above situation becomes a major cause of deterioration of the measurement performance of the ion attachment mass spectrometry apparatus.

Note that there is also the method of using a desiccant, cooler, etc. in order to remove the $H_2O$ and dehydrate the sample gas. This method, however, often also ends up simultaneously removing the gas to be measured and therefore is not practical.

OBJECTS AND SUMMARY

An object of the present invention is to provide an ion attachment mass spectrometry apparatus capable of making the metal ions attached to specific molecules such as $H_2O$ disassociate and forming a state where the metal ions are attached to only the sample gas to be measured and thereby improving the reliability of measurement as to the sample gas.

Another object of the present invention is to provide an ion attachment mass spectrometry apparatus not only able to prevent metal ions from being attached to unnecessary components which would impair the reliability of measurement, but also able to selectively measure only a specific component among a plurality of gas components and thereby able to further improve the reliability of measurement of the sample gas, streamline the measurement, and extend the service life of the apparatus.

According to a first embodiment of the present invention, there is provided an ion attachment mass spectrometry apparatus causing positively charged metal ions to attach to molecules of a sample gas in an attachment region to generate the attached ions and then performing mass spectrometry on the attached ions by a mass spectrometer, provided with a metal ion selective disassociating means for selectively making metal ions attached to specific molecules in the attachment region disassociate.

According to the ion attachment mass spectrometry apparatus, since the metal ion selective disassociating means is provided for selectively making the metal ions attached to specific molecules at the attachment region disassociate, the metal ions attached to molecules obstructing measurement such as $H_2O$ or the other specific molecules not required for measurement can be disassociated to form a state where the metal ions are attached to only the gas to be measured. Therefore, the reliability of measurement of the sample gas can be improved. Further, not only it is possible to prevent the metal ions from attaching to unnecessary gas components which would impair the reliability of measurement, but also it is possible to selectively measure just a specific gas component among a plurality of gas components. Thereby, the reliability of the sample gas can be further improved, the measurement can be performed efficiently, and the service life of the IAMS apparatus can be extended.

Preferably, the metal ion selective disassociating means is a means for selectively heating only specific molecules.

Since the metal ion selective disassociating means is a means for selectively heating only the specific molecules, only the specific molecules are given an energy exciting vibration and rotation. That energy also involves the energy for disassociating the metal ions attached to the specific molecules. Accordingly, only the metal ions attached to the specific molecules can be efficiently disassociated. The ease of attachment of the metal ions and molecules is very strongly dependent not only on the polarity of the molecules, but also temperature. If the temperature becomes higher, even with contact, the ions receive the heat energy and immediately separate. Therefore, it becomes difficult to attach the ion to the molecule. More accurately, the ease of attachment becomes is expressed as an exponential function having a reciprocal of the temperature as a power. Therefore, by making the temperature of the molecules rise, it is possible to cause the attachment efficiency to drop remarkably.

Preferably, the means for selectively heating only the specific molecules is a means for emitting electromagnetic waves with a frequency matching an absorption band of the specific molecules.

According to the above ion attachment mass spectrometry apparatus, since the means for selectively heating only specific molecules is the means for emitting electromagnetic waves with a frequency matching an absorption band of specific molecules, by emitting the electromagnetic waves, it is possible to give only the specific molecules the energy to excite the vibration or rotation in order to effectively heat only the specific molecules. Due to this, it is possible to disassociate only the metal ions attached to the specific molecules. As the method of directly heating the molecules, emission of electromagnetic waves is effective. The heating mechanism differs depending on the wavelength, however. Electromagnetic waves having a wavelength of 0.8 μm to 1 mm or so, or infrared rays, excite vibration of the molecules and heat the same. Electromagnetic waves having a wavelength of 1 mm to 100 cm or so, microwaves, excite rotation of the molecules and heat the same. The vibration of the molecule having a high frequency is excited by the infrared rays of a short wavelength (high frequency). On the other hand, the rotation of the molecule having a low frequency is excited by the microwaves of a long wavelength (low frequency).

It is preferable that only electromagnetic waves of a frequency matching the characteristic frequency of the molecules in the emitted electromagnetic waves (the infrared rays and microwaves) be absorbed by the molecules to contribute to excitation and heating. Electromagnetic waves of frequencies not matching with the characteristic frequency are not absorbed by the molecules and do not contribute to heating. On the other hand, there are generally several characteristic vibrations of molecules. The range of frequency of electromagnetic waves absorbed due to the characteristic vibrations is known as the "absorption band". That is, if the frequency of the electromagnetic waves emitted matches with any of the absorption bands of a molecule, the molecule will be heated. On the other hand, if not matching with any absorption band, it will not be heated.

Preferably, the frequency of the electromagnetic waves matches with an absorption band of the specific molecules, but does not match with any absorption band of the sample gas to be measured.

According to the ion attachment mass spectrometry apparatus, since the frequency of the electromagnetic waves matches with an absorption band of the specific molecules, but does not match with any absorption band of the sample gas, when different types of molecules are mixed together, if emitting electromagnetic waves of a frequency matching with only the absorption band of the specific molecules, only the specific molecules will be heated and the other molecules will not be heated. That is, by utilizing this property, it is possible to selectively heat only the specific molecules.

Note that to select the frequency of the electromagnetic waves, in the case of the infrared rays, an optical filter etc. is used to allow transmission of only a waves of a specific frequency, while in the case of the microwaves, an oscillator having a specific frequency is used. Technology for causing generation of such electromagnetic waves of the specific frequency has been used in many areas in the past. The present invention can utilize these technologies as they are.

Preferably, the metal ion selective disassociating means is a means for emitting electromagnetic waves having a frequency exciting vibration of the attached ions including both of the specific molecules and attached metal ions.

According to the above ion attachment mass spectrometry apparatus, since the metal ion selective disassociating means is a means for emitting electromagnetic waves having a frequency exciting vibration of the attached ions, the vibration of the attached ions formed on the basis of the specific molecules is excited by the emitted electromagnetic waves, vibration of the metal ions is excited, and the metal ions disassociate from the specific molecules when the excitation energy becomes greater than the bonding energy. Due to this, it is possible to form a state where the metal ions are attached to only the gas to be measured, and possible to improve the reliability of measurement of the sample gas.

Preferably, the metal ion selective disassociating means is a means for emitting electromagnetic waves having a frequency corresponding to the bonding energy of the metal ions at the attached ions formed by the specific molecules and the attached metal ions.

According to the above ion attachment mass spectrometry apparatus, since the metal ion selective disassociating means is a means for emitting electromagnetic waves having a frequency corresponding to the bonding energy of the metal ions at the attached ions formed by the specific molecules and the attached metal ions, the metal ions are disassociated by the emission of the electromagnetic waves. Due to this, it is possible to form a state where the metal ions are attached to only the sample gas and possible to improve the reliability of measurement of the sample gas to be measured.

According to a second embodiment of the invention, there is provided an ion attachment mass spectrometry apparatus causing positively charged metal ions to attach to the molecules of the sample gas in the attachment region to generate the attached ions and then performing mass spectrometry on the attached ions by the mass spectrometer, provided with a metal ion attachment inhibiting means for inhibiting attachment of the metal ions to specific molecules in the attachment region.

According to the ion attachment mass spectrometry apparatus, since the metal ion attachment inhibiting means is provided for inhibiting attachment of the metal ions to the specific molecules at the attachment region, it is possible to inhibit the attachment of the metal ions to the molecules obstructing measurement such as $H_2O$ or specific molecules not required for measurement so as to form a state where the metal ions are attached to only the sample gas. Thereby, the reliability of measurement of the sample gas is improved. Further, not only it is possible to prevent the metal ions from attaching to unnecessary gas components which would impair the reliability of measurement, but also it is possible to selectively measure just a specific component among a plurality of gas components. Thereby, the reliability of the sample gas can be further improved, the measurement can be carried out efficiently, and the service life of the analysis apparatus can be extended.

Preferably, the metal ion attachment inhibiting means is a means for selectively heating only the specific molecules.

According to the above ion attachment mass spectrometry apparatus, since the metal ion attachment inhibiting means is the means for selectively heating only the specific molecules, only specific molecules are given an energy exciting vibration and rotation. That energy makes the attachment of the metal ions to the specific molecules difficult. The ease of attachment of metal ions and molecules is very strongly dependent not only on the polarity of the molecules, but also temperature. If the temperature becomes higher, even with contact, the ions receive the heat energy and immediately separate, so become hard to attach. More accurately, the ease of attachment becomes an exponential function having a reciprocal of temperature as a power. Therefore, by making the temperature of the molecules rise, it is possible to cause the attachment efficiency to drop remarkably.

Preferably, the means for selectively heating only the specific molecules is a means for emitting electromagnetic waves having a frequency matching an absorption band of the specific molecules.

According to the above ion attachment mass spectrometry apparatus, since the means for selectively heating only specific molecules is the means for emitting electromagnetic waves having a frequency matching an absorption band of the specific molecules, by emitting the electromagnetic waves, it is possible to give only the specific molecules energy exciting the vibration and rotation and effectively heat only the specific molecules. Further, the energy can make the attachment of the metal ions to the specific molecules difficult. As the method of directly heating the molecules, emission of electromagnetic waves is effective. The heating mechanism differs depending on the wavelength, however. Electromagnetic waves (infrared rays) having a wavelength of 0.8 μm to 1 mm or so excite the vibration of the molecule and heat the same. Electromagnetic wave (microwaves) having a wavelength of 1 mm to 100 cm or so excite the rotation of the molecules and heat the same. The vibration of the molecule having a high frequency is excited by the infrared rays of a short wavelength, that is, high frequency. On the other hand, the rotation of the molecule having a low frequency is excited by the microwaves of a long wavelength, that is, low frequency.

Preferably, the frequency of the electromagnetic waves matches an absorption band of the specific molecules, but does not match any absorption band of the sample gas to be measured.

According to the ion attachment mass spectrometry apparatus, since the frequency of the electromagnetic wave matches the absorption band of the specific molecules, but does not match any absorption band of the sample gas, when different types of molecules are mixed, if emitting electromagnetic waves of a frequency matching only with the absorption band of the specific molecules, only the specific molecules will be heated. The other molecules will not be heated. That is, by utilizing this property, it is possible to selectively heat only the specific molecules.

Preferably, the specific molecules are $H_2O$.

According to the above ion attachment mass spectrometry apparatus, since the specific molecules are the $H_2O$, the electromagnetic waves of a frequency that matches the absorption band of $H_2O$, but does not match any characteristic frequency of the sample gas are emitted to the attachment region of the ion attachment mass spectrometry apparatus, whereby only the $H_2O$ is selectively heated and the metal ions become hard to attach to the $H_2O$.

As will be clear from the above-mentioned explanation, according to an embodiment of the present invention, the following technical effects are exhibited. By providing the metal ion selective disassociating means for causing selective disassociation of the metal ions attached to the specific molecules in the attachment region, it is possible to cause the metal ions attached to specific molecules such as $H_2O$ to disassociate and form a state where metal ions are attached to only the desired gas to be measured and thereby possible to improve the reliability of measurement of the gas. Further, by providing the metal ion attachment inhibiting means for inhibiting attachment of metal ions to specific molecules in the attachment region, it is possible to inhibit the attachment of metal ions to specific molecules such as $H_2O$ to form a state where metal ions are attached to only the sample gas and thereby possible to improve the reliability of measurement of the sample gas.

BRIEF DESCRIPTION OF THE DRAWINGS

The above-mentioned objects and features of the present invention will become clearer from the following description of the preferred embodiments given with reference to the attached drawings, in which:

FIG. 10 shows a table 1 expressing by numerical values the wave number of light absorption according to three characteristic vibrations 1, 2, and 3 of $H_2O$ found by computer simulation based on the principle of quantum dynamics and the relative intensities of the absorption intensities (infrared intensities) and Raman scattering (Raman activity); and FIG. 11 shows a table 2 expressing by numerical values the wave number of light absorption according to six characteristic vibrations 1 to 6 of $H_2O—Li^+$ found by computer simulation based on the principle of quantum dynamics and the relative intensities of the absorption intensities (infrared intensities) and Raman scattering (Raman activity).

DESCRIPTION OF THE PREFERRED EMBODIMENTS

Figure 1:
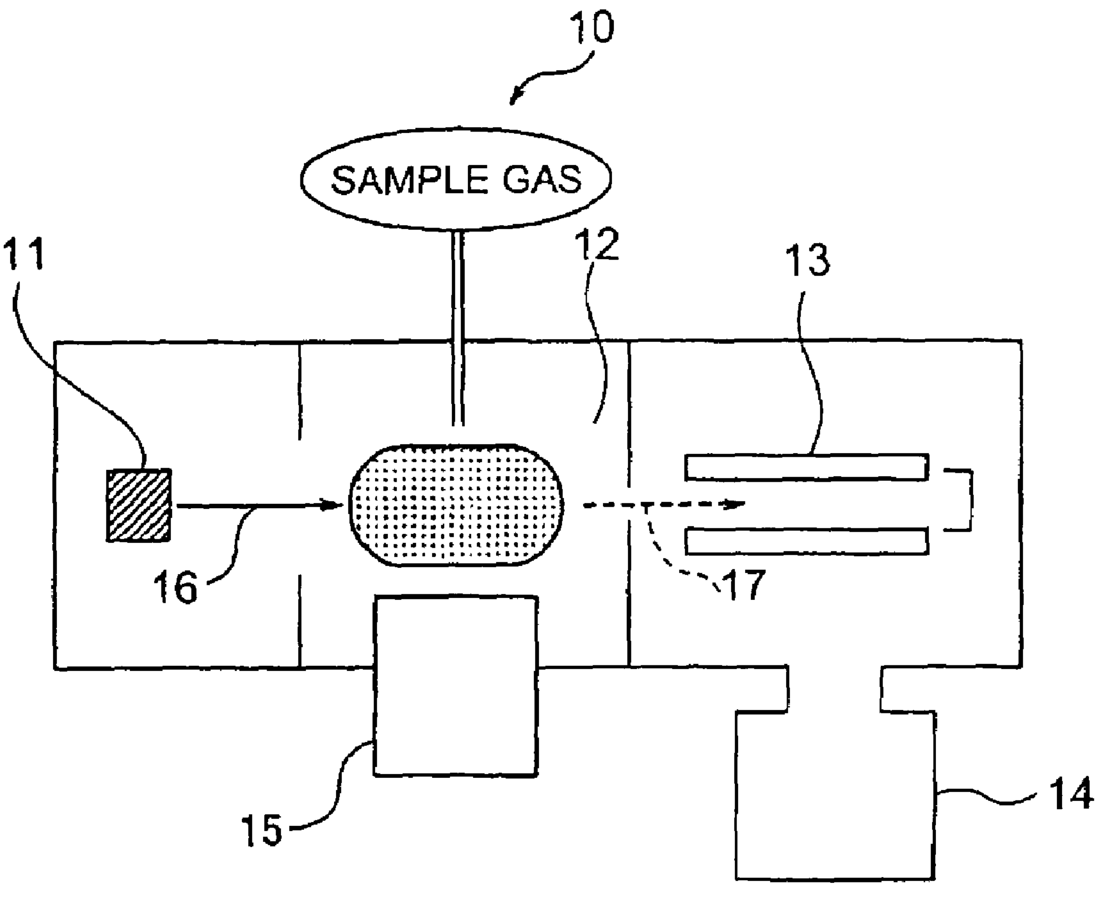
FIG. 1 is a view of an ion attachment mass spectrometry apparatus according to a first embodiment of the present invention.

Next, preferred embodiments of the present invention will be explained with reference to the attached drawings. FIG. 1 shows an ion attachment mass spectrometry apparatus according to a first embodiment of the present invention. In FIG. 1, the ion attachment mass spectrometry apparatus 10 is provided with a metal ion emitter 11, an attachment region 12, and a mass spectrometer 13. The metal ion emitter 11, attachment region 12, and mass spectrometer 13 are arranged in that order from the left side of FIG. 1. The ion attachment mass spectrometry apparatus 10 is provided with a vacuum pump 14. Further, the ion attachment mass spectrometry apparatus 10 is provided with an electromagnetic wave generator 15 as a metal ion selective disassociation apparatus for emitting electromagnetic waves of a specific frequency toward the attachment region 12 near the center of the apparatus.

The metal ion emitter 11 is used for emitting $Li^+$ or other metal ions 16. The metal ion emitter 11 is one comprised of beads made of a matrix ($Li_2O$, $Al_2O_3$, $SiO_3$) including lithium oxide coated on an indium wire filament. By running a current through the filament, the filament is heated, the beads are heated, and $Li^+$ is emitted to the attachment region 12.

The attachment region 12 is a region for introduction of the sample gas to be measured and the attachment of the $Li^+$ or other metal ions 16 emitted from the metal ion emitter 11 to the molecules forming the sample gas.

The mass spectrometer 13 is a meter for analysis of the mass of the attached ions 17 formed by attachment of the metal ions 16 in the attachment region 12. The mass spectrometer 13 is for example a Q-pole mass spectrometer. Further, the vacuum pump 14 evacuates the ion attachment mass spectrometry apparatus 10 to a vacuum state.

The electromagnetic wave generator 15 is an apparatus used as a metal ion selective disassociation apparatus and generates electromagnetic waves of a specific frequency. The electromagnetic wave generator 15 emits electromagnetic waves at the attachment region 12 and selectively disassociates the metal ions 16 attached to specific molecules. For example, when the specific molecules are $H_2O$, the specific frequency matches with an absorption band of $H_2O$. The attachment region 12 contains the introduced the sample gas and the $Li^+$ emitted by the metal ion emitter 11. The sample gas contains the sample gas to be measured and $H_2O$ mixed together.

Next, the operation of the ion attachment mass spectrometry apparatus 10 according to the first embodiment of the present invention will be explained.

Figure 2A:
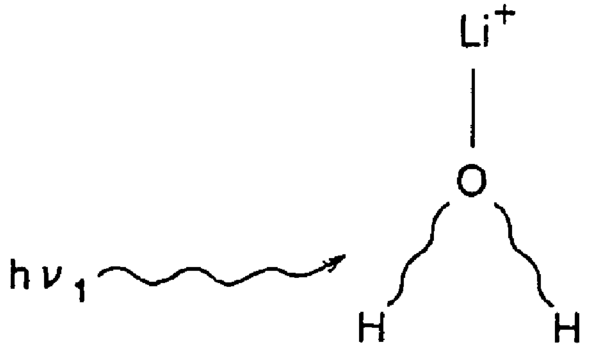
FIGS. 2A to 2C are schematic views of the state of electromagnetic waves being emitted to an attachment region to selectively heat $H_2O$.
Figure 2B:
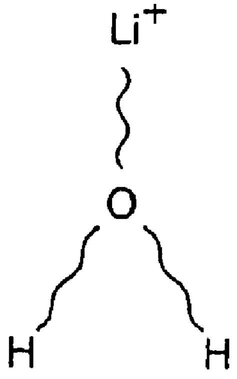
Figure 2C:
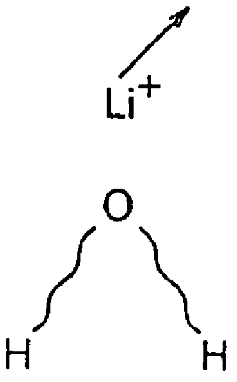

When the metal ion emitter 11 is heated, $Li^+$ or other positively charged metal ions 16 are discharged into space and attach to the inherent sample gas to be measured in the gases introduced to the attachment region 12, whereby a gas with metal ions 16 attached is produced. At the same time, there is also $H_2O$ in the sample gas introduced to the attachment region, so metal ions also attach to the $H_2O$. At this time, if operating the electromagnetic wave generator 15 for generating electromagnetic waves of a specific frequency having a frequency matching an absorption band of $H_2O$, the attachment region 12 is exposed to the electromagnetic waves and the $H_2O$ is selectively heated. This state is schematically shown in FIGS. 2A to 2C. As shown in FIG. 2A, in $H_2O$ exposed to electromagnetic waves $h\nu_1$ of a specific frequency matching an absorption band of $H_2O$, the vibration between the oxygen atom and the hydrogen atom or the rotation of $H_2O$ molecule is excited by the energy of the electromagnetic waves. Due to this, as shown in FIG. 2B, vibration between the $Li^+$ and oxygen atoms is excited. When this excitation is more than the bonding energy of $Li^+$, as shown in FIG. 2C, $Li^+$ disassociates from the $H_2O$. In this way, the metal ions 16 become difficult to attach to the $H_2O$. As a result, in the attachment region 12, the attached ions 17 with metal ions attached become just the molecules of the sample gas and the $H_20$ with metal ions 16 attached are reduced. Just attached ions 17 with metal ions attached to only molecules of the sample gas are introduced to the inside of the mass spectrometer 13, where the mass of the attached ions is measured.

In this way, with the ion attachment mass spectrometry apparatus according to the first embodiment of the present invention, the effect of $H_2O$ is reduced and the gas to be measured can be normally measured. Note that the specific component was made $H_2O$ or another component obstructing measurement, but it may also be made any other component not particularly required for measurement. By doing this, it is possible to measure just attached ions obtained by attachment of metal ions to only the gas components desired to be measured.

Figure 3A:
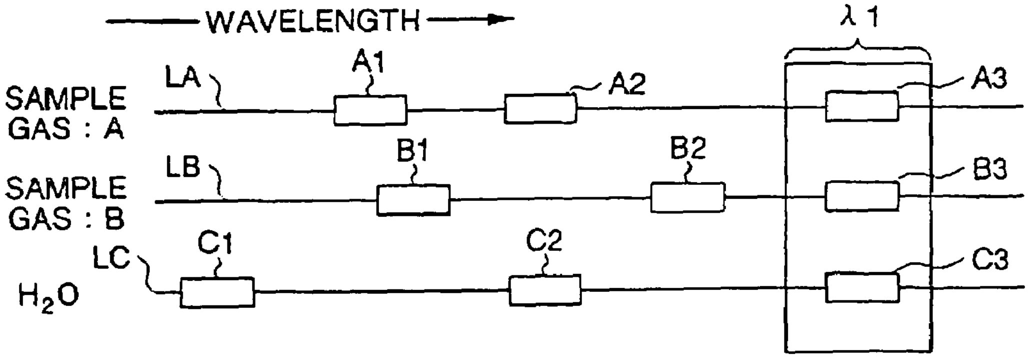
FIGS. 3A to 3C are views schematically showing that the gas which is heated differs by the frequency of the electromagnetic waves emitted when two types of sample gases A and B and $H_2O$ are mixed together.
Figure 3B:
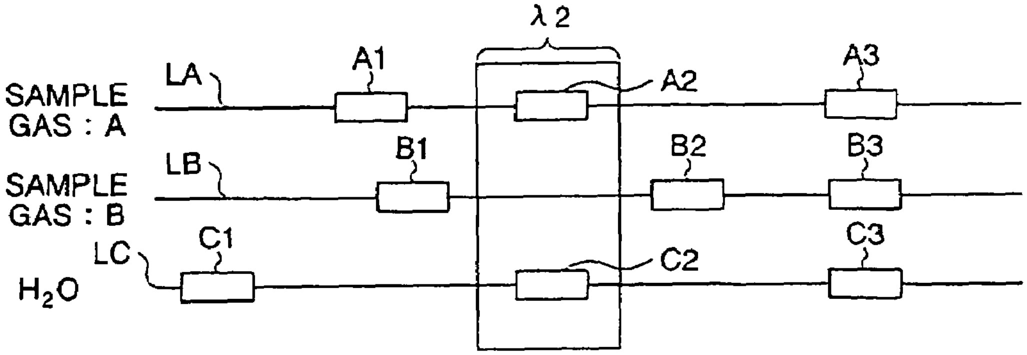
Figure 3C:
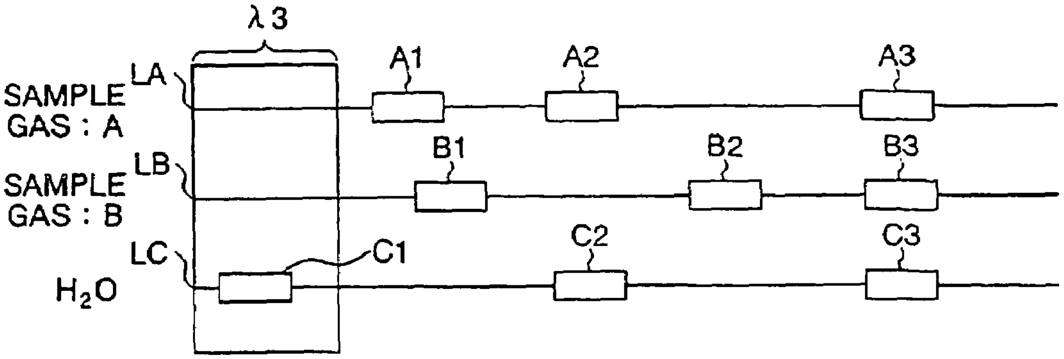

Next, the frequency of the electromagnetic waves to be emitted in the attachment region 12 will be explained. FIGS. 3A to 3C schematically showing that the gas being heated differs by the frequency of the electromagnetic waves emitted when two types of the sample gases (A and B) and $H_2O$ are mixed (three patterns). In FIGS. 3A to 3C, the line LA shows a wavelength range expressing the absorption bands of the sample gas A, the line LB shows a wavelength range expressing the absorption bands of the sample gas B, and the line LC shows a wavelength range expressing the absorption bands of $H_2O$. This figure is drawn very simply, but actually there are an extremely large number of absorption bands. These absorption bands also differ greatly in efficiency of absorption of electromagnetic waves. That is, there are strong absorption bands and weak absorption bands. A large number of these are distributed over a broad range. In FIGS. 3A to 3C, the absorption bands of the sample gas A are shown by A1, A2, and A3, the absorption bands of the sample gas B are shown B1, B2, and B3, and the absorption bands of $H_2O$ are shown by C1, C2, and C3.

As shown in FIG. 3A, when the specific frequency of the electromagnetic waves emitted is at the inside of the wavelength range $\lambda 1$, the absorption band A3 of the sample gas A, the absorption band B3 of the sample gas B, and the absorption band C3 of $H_2O$ match, and all of the sample gas A, sample gas B, and $H_2O$ are heated. Further, as shown in FIG. 3B, when a specific frequency, that is, specific wavelength, of the electromagnetic wave emitted is in the wavelength range λ2, it matches with the absorption band A2 of the sample gas A and the absorption band C2 of $H_2O$, so the sample gas A and $H_2O$ are heated. Further, as shown in FIG. 3C, since the specific frequency, that is, specific wavelength, of the electromagnetic wave emitted is in the wavelength range λ3, only the absorption band C1 of $H_2O$ is matched with, so only $H_2O$ is heated.

However, if emitting electromagnetic waves with a frequency matching a strong absorption band of $H_2O$, for example, the absorption band C1, it is possible to selectively heat $H_2O$ and make attachment of metal ions to $H_2O$ difficult. As a result, the effects of $H_2O$ are eliminated, and sample gas is normally measured.

Next, the specific frequency will be explained. An ion attachment mass spectrometry apparatus is useful for analysis of organic matter, so a frequency matching the strong absorption bands of $H_2O$, but not matching with any absorption band of various organic matter becomes important. $H_2O$ has a strong absorption band at 3 μm with respect to infrared rays (with infrared rays, in accordance with custom, an absorption band is expressed by wavelength, where 1 $\mu m=1\times10^{-6}$ m). As opposed to this, various types of organic matter have weak absorption bands near 3 μm, but strong absorption bands at 4 to 20 μm. Therefore, if emitting infrared rays of a wavelength of 3 μm, mainly the $H_2O$ will be heated, while the organic matter of the sample gas will not be heated much at all.

On the other hand, $H_2O$ also has absorption bands at under 2 μm. Specifically, there are absorption bands at 1.9 μm, 1.5 μm, 1.2 μm, etc. Therefore, if emitting infrared rays matching with one of these wavelengths, only the $H_2O$ will be heated. The organic matter of the sample gas will not be heated at all.

In the same way, $H_2O$ has strong absorption bands at 22 GHz, 10 GHz, 2.45 GHz, and 0.9 GHz with respect to microwaves. Here, "1 GHz" is $1\times10^9$ Hz. Therefore, if emitting microwaves matching with one of these frequencies, $H_2O$ will mainly be heated and the sample gas will not be heated much at all. Note that 2.45 GHz is used in a microwave oven.

As the method for selectively heating molecules, in addition to the use of the absorption of microwaves or infrared rays, the method of use of the Raman effect may be considered. The "Raman effect" is the phenomenon that when molecules are irradiated by ultraviolet light and visible light, dielectric polarization occurs at the molecules, the energy level of vibration is raised, and an energy equal to the characteristic frequency of the molecules is scattered. As the light source, a laser is used. It is possible to utilize this to selectively heat only water molecules, exposing the sample gas to electromagnetic waves of a frequency band having Raman activity for only wager molecules. Having Raman activity basically means vibration symmetric about the center of a symmetric molecule.

Table 1 shown in FIG. 10 expresses by numerical values the wave number of light absorption, the relative intensities of the absorption intensities (infrared intensities) and Raman scattering (Raman activity) according to three characteristic vibrations 1, 2, and 3 of $H_2O$ found by computer simulation (Gaussian 98) based on the principle of quantum dynamics.

Figure 4A:
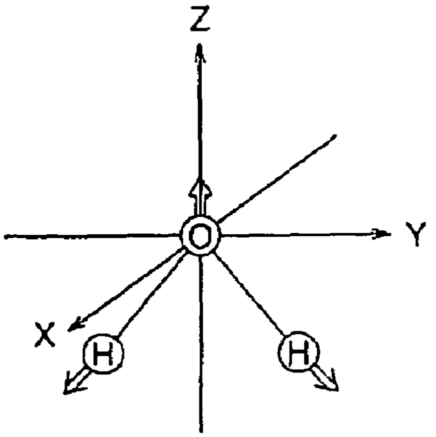
FIGS. 4A to 4C are schematic views of the displacement of vibration of atoms when arranging an oxygen atom and two hydrogen atoms on an XYZ coordinate system.
Figure 4B:
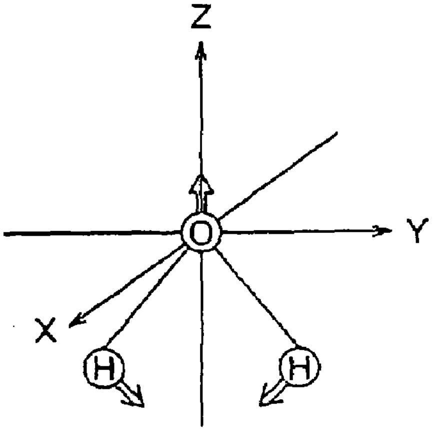
Figure 4C:
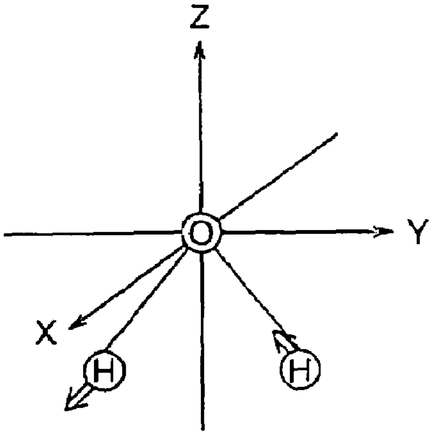

X, Y, and Z in Table 2 show the displacement of vibration of atoms when arranging an oxygen atom and two hydrogen atoms on the XYZ coordinate system of FIGS. 4A to 4C. With characteristic vibration 1, the vibration becomes as shown in FIG. 4A, with characteristic vibration 2, the vibration becomes as shown in FIG. 4B, and with characteristic vibration 3, the vibration becomes as shown in FIG. 4C. As will be understood from Table 1, water has a strong Raman activity at frequencies of 3804 $cm^{-1}$ (2.63 μm) and 3927 $cm^{-1}$ (2.55 μm). These wavelength regions have little absorption of the organic molecules of the sample gas and have a high selectivity. However, when heating the water molecules present in a high concentration, the collision with the water molecules causes the molecules of the sample gas to be heated as well and sometimes the attachment sensitivity of the molecules of the sample gas to end up falling.

However, if emitting infrared rays, microwaves, or other electromagnetic waves with frequencies matching a strong absorption band of $H_2O$ in this way, it is possible to selectively heat $H_2O$ and make attachment of metal ions to $H_2O$ difficult. As a result, the effects of $H_2O$ are eliminated and sample gas is normally measured.

Figure 5:
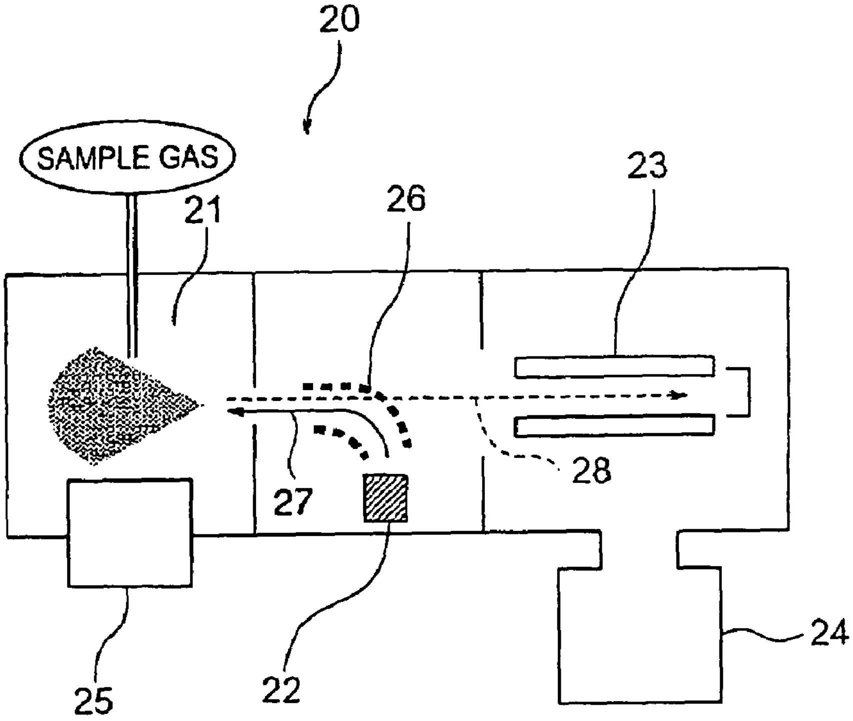
FIG. 5 is a view of an ion attachment mass spectrometry apparatus according to a second embodiment of the present invention.

Next, an ion attachment mass spectrometry apparatus of a second embodiment of the present invention will be explained with reference to FIG. 5. The ion attachment mass spectrometry apparatus 20 is provided with an attachment region 21, a metal ion emitter 22, and a mass spectrometer 23 arranged in that order from the left side in FIG. 5 and a vacuum pump 24. In addition, an electromagnetic wave generator 25 of a specific frequency is provided as a metal ion selective disassociation apparatus facing the attachment region 21 provided at the left end of the apparatus. The metal ions 27 emitted from the metal ion emitter 22 are deflected by the electrostatic deflector 26, then the metal ions 27 are introduced to the attachment region 21. The metal ions introduced to the attachment region 21 are slowed down and reflected resulting in efficient attachment. The rest of the structure is similar to that of the first embodiment, so will not be explained.

The operation of the ion attachment mass spectrometry apparatus 20 according to the second embodiment of the present invention will be explained next. When the metal ion emitter 22 is heated, $Li^+$ or other positively charged metal ions 27 are discharged into space. The metal ions 27 are introduced to the attachment region 21. The metal ions 27 then attach to the sample gas introduced to the attachment region 21, whereby a gas with metal ions attached is produced. At the same time, there is also $H_2O$ in the sample gas introduced to the attachment region 21. At this time, if operating the electromagnetic wave generator 25 for generating electromagnetic waves of a specific frequency having a frequency matching an absorption band of $H_2O$, the attachment region 21 is exposed to the electromagnetic waves and the $H_2O$ is selectively heated. At this time, in the same way as in the first embodiment, the once attached $Li^+$ disassociates from the $H_2O$. In this way, the metal ions 27 become difficult to attach to the $H_2O$. As a result, in the attachment region 21, the attached ions 28 with metal ions 27 attached become just the molecules of the sample gas and the $H_2O$ with metal ions 27 attached are reduced. Just attached ions 28 with metal ions 27 attached are introduced to the inside of the mass spectrometer 23, where the mass of the attached ions 28 is measured.

In this way, according to the ion attachment mass spectrometry apparatus of the second embodiment of the present invention, the effect of $H_2O$ can be reduced and the sample gas can be normally measured.

Next, the ion attachment mass spectrometry apparatus according to a third embodiment of the present invention will be explained. The third embodiment is similar to the first embodiment (and second embodiment) in the above-mentioned ion attachment mass spectrometry apparatus 10 (20) except for making the specific frequency of the electromagnetic waves generated from the electromagnetic wave generator 15 (25) a frequency exciting vibration of attached ions formed by the specific molecules and the metal ions attached, so the explanation of the structure of the apparatus will be omitted.

When the metal ion emitter 11 (22) is heated, $Li^+$ or other positively charged metal ions are discharged into space and introduced to the attachment region 12 (21). They then attach to the sample gas introduced to the attachment region 12 (21), whereby a gas with metal ions attached is produced. At the same time, there is also $H_2O$ in the sample gas introduced to the attachment region 12 (21). At this time, for example, if operating the electromagnetic wave generator 15 (25) for generating electromagnetic waves of a specific frequency having a frequency exciting the characteristic vibration of the attached ions formed by $H_2O$ and the attached metal ions, the attachment region 12 (21) is exposed to the electromagnetic waves and vibration of the attached ions is excited.

Figure 6A:
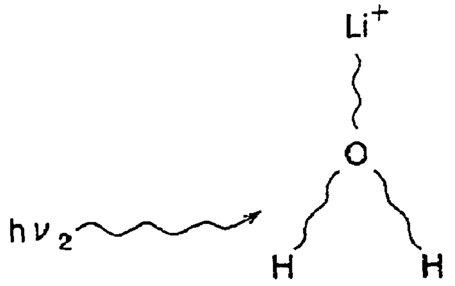
FIGS. 6A and 6B are schematic views of the state of emission of electromagnetic waves at the attachment region and excitation of vibration of attached ions.
Figure 6B:
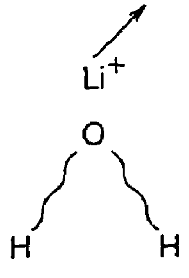

The state of excitation of vibration of attached ions is schematically shown in FIGS. 6A and 6B. In FIG. 6A, the attached ions ($H_2O$—$Li^+$) formed by $H_2O$ and the attached metal ions are exposed to electromagnetic waves $h\nu_2$ of a specific frequency for exciting their characteristic vibration. With attached ions ($H_2O$—$Li^+$), the vibration between the oxygen atom, the hydrogen atom, and $Li^+$ or the rotation of $H_2O$—$Li^+$ is excited by the energy of the electromagnetic waves $h\nu_2$ of the specific frequency. Due to this, vibration is excited between $Li^+$ and oxygen atoms. When this vibration energy is more than the bonding energy of $Li^+$, as shown in FIG. 6B, the $Li^+$ disassociates from the $H_2O$. In this way, metal ions $Li^+$ become hard to attach to the $H_2O$. As a result, in the attachment region 12 (21), the attached ions with metal ions attached become just the molecules of the sample gas, while the $H_2O$ with metal ions attached are reduced. Just attached ions with metal ions attached are introduced to the inside of the mass spectrometer 13 (23), where the mass of the attached ions is measured.

Next, the results of a computer simulation will be shown. As explained above, if heating $H_2O$—$Li^+$ having lithium attached, since $H_2O$—$Li^+$ is an order of magnitude scarcer than water molecules in the neutral state, the possibility of heating the molecules of sample gas becomes low. Further, the absorption band of the $H_2O$—$Li^+$ used in the embodiment was newly discovered in the process of researching the present invention. According to a computer simulation based on the principle of quantum dynamics, there are the six characteristic vibrations of the $H_2O$—$Li^+$ attached ions shown in Table 2 in FIG. 11.

Figure 7A:
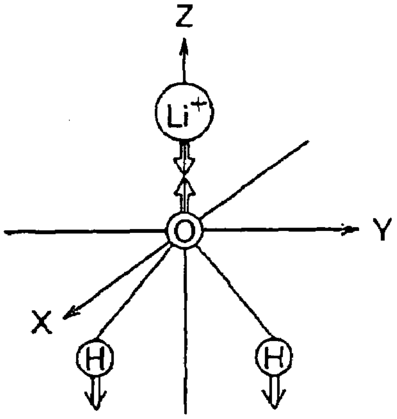
FIGS. 7A to 7F are schematic views of the displacement of vibration of atoms or ions when arranging an oxygen atom, two hydrogen atoms, and an $Li^+$ ion on an XYZ coordinate system.
Figure 7B:
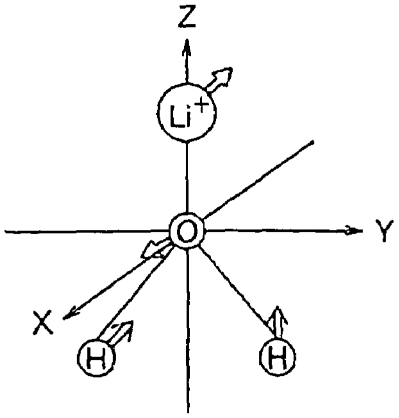
Figure 7C:
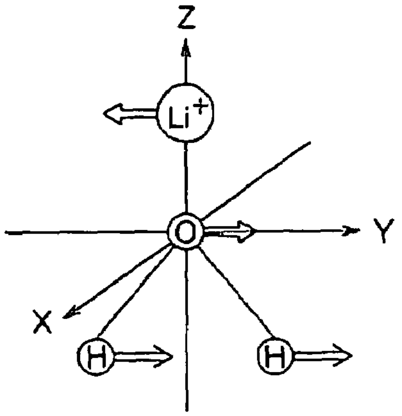
Figure 7D:
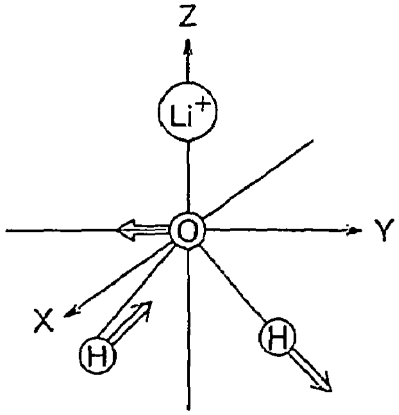
Figure 7E:
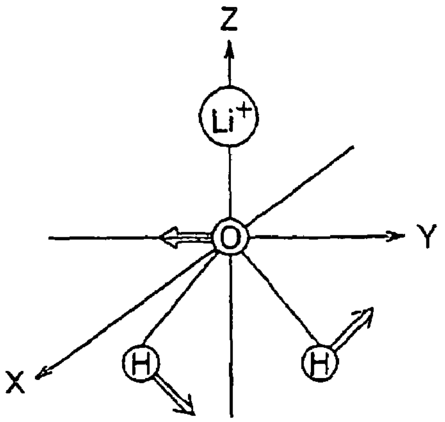
Figure 7F:
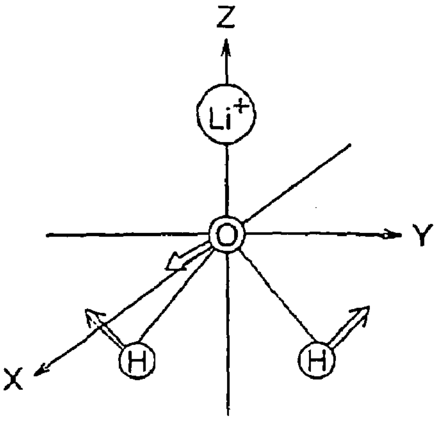

Table 2 expresses by numerical values the wave numbers of light absorption, the relative intensities of the absorption intensities (infrared intensities), and Raman scattering (Raman activity) according to six characteristic vibrations 1 to 6 of $H_2O$—$Li^+$ found by computer simulation based on the principle of quantum dynamics. Further, X, Y, and Z in Table 2 show the displacement of vibration of the atoms or ions when arranging an oxygen atom, two hydrogen atoms, and $Li^+$ on the XYZ coordinate system of FIGS. 7A to 7F. With the characteristic vibration 1, the vibration becomes as shown in FIG. 7A, with the characteristic vibration 2, the vibration becomes as shown in FIG. 7B, with the characteristic vibration 3, the vibration becomes as shown in FIG. 7C, with the characteristic vibration 4, the vibration becomes as shown in FIG. 7D, with the characteristic vibration 5, the vibration becomes as shown in FIG. 7E, and with the characteristic vibration 6, the vibration becomes as shown in FIG. 7F.

The infrared absorption 415 $cm^{-1}$ utilized in the third embodiment is due to the stretching vibration of hydrogen. The Raman absorptions of 3776 $cm^{-1}$ and 3858 $cm^{-1}$ are symmetric vibrations of the hydrogen atom with respect to an oxygen atom. The O—$Li^+$ bonds utilized in the later mentioned fourth embodiment are due to the absorption band due to the characteristic vibration 3.

As will be understood from Table 2 of FIG. 11, $H_2O$—$Li^+$, like water molecules, has an the characteristic vibration frequency. There is a strong infrared absorption at 415 $cm^{-1}$ (24.1 μm). This characteristic frequency does not overlap with any absorption band of water or an organic compound at all, so is considered effective for selective heating of $H_2O$—$Li^+$. Further, the Raman absorption includes Raman activity strong at 3776 $cm^{-1}$ and 3858 $cm^{-1}$ (2.65 μm and 2.59 μm). These wavelength bands are 30 to 40 $cm^{-1}$ off from water molecules, so it is possible to selectively heat the $H_2O$—$Li^+$.

If emitting infrared rays with an the characteristic vibration of the bonding parts of $H_2O$—$Li^+$ (O—$Li^+$ bonds) to directly cut the bonds, since there is much less $H_2O$—$Li^+$ compared with the $H_2O$ present, due to the collisions with $H_2O$—$Li^+$, the molecules of the sample gas will not be heated and the attachment sensitivity will not drop. The absorption band of the $H_2O$—$Li^+$ bonding parts, that is, between O—$Li^+$, is 551 $cm^{-1}$ (18.15 μm). It is possible to emit infrared rays to selectively cut O—$Li^+$ bonds.

In this way, according to the ion attachment mass spectrometry apparatus of the third embodiment of the present invention, the effect of $H_2O$ can be reduced and the sample gas can be normally measured.

Next, the ion attachment mass spectrometry apparatus according to a fourth embodiment of the present invention will be explained. The fourth embodiment is similar to the first embodiment (and second embodiment) in the above-mentioned ion attachment mass spectrometry apparatus 10 (20) except for making the specific frequency generated from the electromagnetic wave generator 15 (25) a frequency corresponding to the bonding energy of specific molecules and the metal ions in the attached ions formed by metal ions attached to them. The explanation of the structure of the apparatus will therefore be omitted.

When the metal ion emitter 11 (22) is heated, $Li^+$ or other positively charged metal ions are discharged into space and introduced to the attachment region 12 (21). They then attach to the sample gas introduced to the attachment region 12 (21), whereby a gas with metal ions attached is produced. At the same time, there is also $H_2O$ in the sample gas introduced to the attachment region 12 (21). At this time, for example, if operating the electromagnetic wave generator 15 (25) for generating electromagnetic waves of a specific frequency corresponding to a bonding energy of the metal ions at the attached ions, the attachment region 12 (21) is exposed to the electromagnetic waves and the metal ions at the attached ions are disassociated. This state is schematically shown in FIGS. 8A and 8B.

Figure 8A:
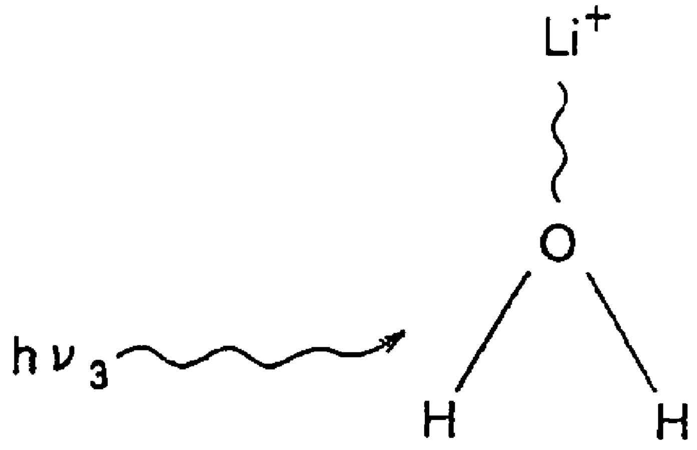
FIGS. 8A and 8B are schematic views of the state of emission of electromagnetic waves at the attachment region and disassociation of the metal ions.
Figure 8B:
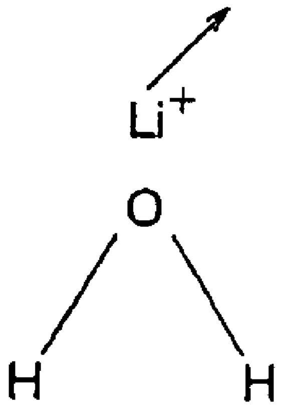

As shown in FIG. 8A, the attached ions ($H_2O$—$Li^+$) exposed to electromagnetic waves $h\nu_3$ of a specific frequency corresponding to the bonding energy of the metal ions attached to the $H_2O$ excite a bonded state between the oxygen atom and $Li^+$. Due to this, as shown in FIG. 8B, the $Li^+$ disassociates from the $H_2O$. In this way, metal ions become difficult to attach to the $H_2O$. As a result, in the attachment region 12 (21), the attached ions with metal ions become just the molecules of the sample gas, while the $H_2O$ with metal ions is reduced. Just attached ions with metal ions are introduced to the inside of the mass spectrometer 13 (23), where the mass of the attached ions is measured.

In this way, according to the ion attachment mass spectrometry apparatus of the fourth embodiment of the invention, it is possible to reduce the effects of $H_2O$ and correctly measure the sample gas.

Next, the ion attachment mass spectrometry apparatus according to a fifth embodiment of the present invention will be explained. The fifth embodiment is similar to the first embodiment (and second embodiment) in the above-mentioned ion attachment mass spectrometry apparatus 10 (20) except that an electromagnetic wave generator 15 (25) is used as the metal ion attachment inhibiting device, and the specific frequency generated from the electromagnetic wave generator 15 (25) is made a frequency for forming an excited state of specific molecules which would obstruct attachment of metal ions to the specific molecules.

When the metal ion emitter 11 (22) is heated, $Li^+$ or other positively charged metal ions are discharged into space and introduced to the attachment region 12 (21). The positively charged metal ions attach to the sample gas introduced to the attachment region 12 (21). Due to this, gas with metal ions attached is generated. There is also $H_2O$ in the sample gas introduced to the attachment region 12 (21). At this time, for example, if inhibiting attachment of metal ions to specific molecules such as $H_2O$ by operating the electromagnetic wave generator 15 (25) to generate electromagnetic waves of a specific frequency for forming an excited state of the specific molecules, the attachment region 12 (21) is exposed to the electromagnetic waves and attachment of metal ions to the specific molecules is inhibited based on this excited state. Here, the "excited state of the specific molecules" inhibiting attachment of metal ions is the state of for example excitation of the rotational motion of molecules. This state is shown schematically in FIG. 9.

Figure 9A:
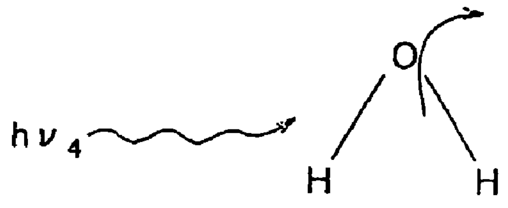
FIGS. 9A to 9C are schematic views of the state of emission of electromagnetic waves at the attachment region and greater difficulty of attachment of metal ions at water molecules.
Figure 9B:
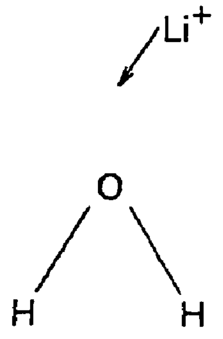
Figure 9C:
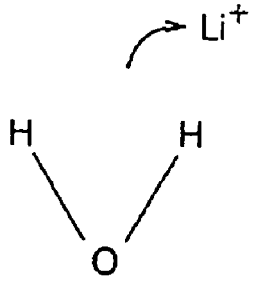

As shown in FIG. 9A, $H_2O$ molecules exposed to electromagnetic waves $h\nu_4$ of a specific frequency corresponding to the energy for exciting rotation of the $H_2O$ molecules undergo rotation. Due to this, as shown in FIG. 9B, at a certain instant, the $Li^+$ is attached to the oxygen atoms when there is $Li^+$ present at the oxygen atom side of the $H_2O$ molecules. However, since rotational motion of the $H_2O$ molecules is excited, in another instant, as shown in FIG. 9C, the hydrogen atoms approach the $Li^+$ in state. At this time, since the hydrogen atoms have positive charges, the $Li^+$ is repulsed by the hydrogen atoms. As a result, when the rotational motion of the $H_2O$ molecules is excited, metal ions become hard to attach to $H_2O$. In the attachment region 12 (21), attached ions with metal ions become just the molecules of the sample gas. The $H_2O$ with the metal ions attached is reduced. Just attached ions with metal ions attached to molecules of the sample gas are introduced to the mass spectrometer 13 (23), where the mass of the attached ions is measured.

In this way, according to the ion attachment mass spectrometry apparatus of the fifth embodiment of the invention, it is possible to reduce the effects of $H_2O$ and correctly measure the sample gas.

When using an apparatus emitting an electromagnetic wave having a frequency matching with an absorption band of specific molecules as the attachment inhibiting means, it is possible to emit electromagnetic waves to give energy for exciting molecular vibration to specific molecules and effectively heat only specific molecules and possible to make attachment of metal ions to specific molecules by this energy difficult. As the method of directly heating molecules, emission of electromagnetic waves is effective. The mechanism of heating differs according to the wavelength. An electromagnetic wave having a wavelength of 0.8 μm to 1 mm or so (infrared rays) excites vibration of the molecules and causes heating. Electromagnetic waves having a wavelength of 1 mm to 100 cm (microwaves) excite rotation of molecules and cause heating. Vibration of the molecules having a high characteristic frequency is excited by infrared rays of a short wavelength, that is, high frequency. On the other hand, rotation having a low characteristic frequency is excited by microwaves of a long wavelength, that is, low frequency.

Further, by making the frequency of the electromagnetic waves match an absorption band of specific molecules, but not match any absorption band of the sample gas, when different types of molecules are mixed, if emitting electromagnetic waves of a frequency matching only an absorption band of the specific molecules, only the specific molecules will be heated. The other molecules will not be heated. That is, by utilizing this property, it is possible to selectively heat only specific molecules.

In the above embodiments, the explanation was given only regarding $H_2O$ as the component in question, but sometimes the effects of other components should be eliminated. When the sample is a solid or liquid, it is often measured in a form dissolved in acetone or another solvent, but acetone or another solvent has a high polarity like $H_2O$ and extremely easily attaches with metal ions. The problem can be solved by emitting electromagnetic waves of a frequency corresponding to the absorption band of acetone or another solvent, electromagnetic waves exciting vibration or rotation of the attached ions comprised of the metal ions attached to acetone, or electromagnetic waves of a frequency corresponding to the bonding energy of the metal ions attached to acetone.

As the metal ions, $Li^+$ was used, but the invention is not limited to this. It is also possible to use $K^+$, $Na^+$, $Rb^+$, $Cs^+$, $Al^+$, $Ga^+$, $In^+$, and other monovalent ions or bivalent ions. Further, as the mass spectrometer, it is possible to use a Q-pole mass spectrometer, ion trap mass spectrometer using an external ionization system, a magnetic field sector mass spectrometer, a time-of-flight (TOF) mass spectrometer, or an ion cyclotron resonance (ICR) mass spectrometer. Further, it is also possible to connect this apparatus to another separation apparatus, for example, a gas chromatograph or liquid chromatograph, to form a gas chromatograph/mass spectrograph (GC/MS) and liquid chromatograph/mass spectrograph (LC/MS).

The configuration, shape, size, and positional relationship explained in the embodiments are shown only schematically to an extent enabling the present invention to be understood and worked. Further, the numerical values are only illustrations. Therefore, the present invention is not limited to the embodiments explained below. Various modifications are possible so long as not exceeding the gist of the technical idea shown in the claims.

The present disclosure relates to subject matter contained in Japanese Patent Application No. 2003-95502 filed on Mar. 31, 2003, the disclosure of which is expressly incorporated herein by reference in its entirety.

Although only preferred embodiments are specifically illustrated and described herein, it will be appreciated that many modifications and variations of the present invention are possible in light of the above teachings and within the purview of the appended claims without departing from the spirit and intended scope of the invention.

The invention claimed is:

1. An ion attachment mass spectrometry apparatus causing positively charged metal ions to attach to analyte molecules to be measured in an attachment region to generate attached ions and then performing mass spectrometry on said attached ions by a mass spectrometer, comprised of:

a metal ion emitter for emitting said metal ions to said attachment region, an introduction unit for introducing said analyte molecules into said attachment region, means for inhibiting attachment of said metal ions to one or more groups of molecules in said attachment region, and a mass spectrometer for performing said mass spectrometry.

2. The ion attachment mass spectrometry apparatus as set forth in claim 1, wherein said metal ion attachment inhibiting means includes means for selectively heating only said one or more groups of molecules.

3. The ion attachment mass spectrometry apparatus as set forth in claim 2, wherein said means for selectively heating only said specific molecules is a means for emitting electromagnetic waves having a frequency matching an absorption band of said one or more groups of molecules.

4. The ion attachment mass spectrometry apparatus as set forth in claim 3, wherein the frequency of said electromagnetic waves matches an absorption band of said one or more groups of molecules, but does not match any absorption band of said analyte molecules.

5. The ion attachment mass spectrometry apparatus as set forth in claim 1, wherein said one of said groups of molecules are $H_2O$ molecules.

6. The ion attachment mass spectrometry apparatus as set forth in claim 1, wherein at least one of said groups of molecules are $H_2O$ molecules.

7. An ion attachment mass spectrometry apparatus causing positively charged metal ions to attach to analyte molecules to be measured in an attachment region to generate attached ions and then performing mass spectrometry on said attached ions by a mass spectrometer, comprised of:

a metal ion emitter for emitting said metal ions to said attachment region, an introduction unit for introducing said analyte molecules into said attachment region, a heater for inhibiting attachment of said metal ions to one or more groups of molecules in said attachment region, and a mass spectrometer for performing said mass spectrometry.

8. The ion attachment mass spectrometry apparatus as set forth in claim 7, wherein said heater includes means for selectively heating only said one or more groups of molecules.

9. The ion attachment mass spectrometry apparatus as set forth in claim 8, wherein said means for selectively heating only said specific molecules is a means for emitting electromagnetic waves having a frequency matching an absorption band of said one or more groups of molecules.

10. The ion attachment mass spectrometry apparatus as set forth in claim 9, wherein the frequency of said electromagnetic waves matches an absorption band of said one or more groups of molecules, but does not match any absorption band of said analyte molecules.

* * * * *